3,739,043
LOW TEMPERATURE POLYMERIZATION PROCESS
Michael Fryd, Philadelphia, Pa., and John L. Ludlow, Wilmington, Del., assignors to E. I. du Pont de Nemours and Company, Wilmington, Del.
No Drawing. Original application Oct. 20, 1969, Ser. No. 867,903. Divided and this application Nov. 18, 1971, Ser. No. 200,198
Int. Cl. C08f 15/26
U.S. Cl. 260—885     1 Claim

ABSTRACT OF THE DISCLOSURE

A process for preparing a polymer by low temperature polymerization in an organic liquid, using as a polymerization initiator a system which comprises
(1) a peroxy or peracid compound,
(2) an organic reducing agent,
(3) a metal salt, and
(4) a small amount of water.

CROSS-REFERENCE TO RELATED APPLICATIONS

This application is a divisional of copending application Ser. No. 867,903, filed Oct. 20, 1969, and now abandoned.

BACKGROUND OF THE INVENTION

When preparing synthetic organic polymers in organic media, it is sometimes desirable to use as low a polymerization temperature as possible to avoid producing low molecular weight polymer fractions. Initiating systems now exist which function in organic media at such low temperatures. For example, metal alkyls, unstable peroxides and azo compounds, and trialkyl borons with oxygen can be used. But these systems have disadvantages such as instability, use difficulties and hazards, and high cost.

SUMMARY OF THE INVENTION

An initiator system has now been found which minimizes these disadvantages. This system is composed of
(1) a peroxy or peracid compound,
(2) an organic reducing agent,
(3) a metal salt, and
(4) a small amount of water.

The initiator system can be used in the polymerization, in an organic liquid, of ethylenically unsaturated monomers or mixtures of monomers. It works especially well in the preparation of acrylic polymers or copolymers such as poly(methyl methacrylate), poly(butyl acrylate), poly(acrylonitrile) and poly(methacrylonitrile). It also works well in the preparation of vinyl ester polymers or copolymers such as polyvinyl chloride and polyvinylidene chloride. It can also be used with good results in the preparation of acrylic graft copolymers and block copolymers.

Utility of the product

The liquid product one obtains by using this initiator system can be used directly to prepare paints or other coating compositions, or to prepare adhesives.

If it is necessary that the polymer be isolated, this can be done quite easily by simply stripping off the organic liquid with heat, or under vacuum. In this way a bulk polymer or an unsupported film of the polymer can be prepared.

The peroxy or peracid compound

The peroxy or peracid compound used can be represented by the structure

R—O—O—R$_1$ where

R can be an alkyl or aralkyl radical of 1–20 carbon atoms, or an aliphatic or aromatic acyl radical; and
R$_1$ can be hydrogen, an alkyl or aralkyl radical of 1–20 carbon atoms, or an aliphatic or aromatic acyl radical.

As explained, the initiator system can be used to prepare graft, block or conjunctive copolymers as described in copending application Ser. No. 255,135, filed May 19, 1972. When this is done, the alkyl or acyl radicals of these peroxy or peracid compounds can be part of the precursor polymer chain, either in the middle or at the ends. Such a precursor polymer can be prepared by conventionally copolymerizing an ethylenically unsaturated monomer with from about 0.1% through about 50%, by weight, of a monomer represented by the structure

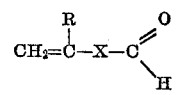

where

R can be hydrogen, alkyl of 1 through 18 carbon atoms, phenyl or phenyl substituted with alkyl of 1 through 4 carbon atoms;
X can be phenylene or (CH$_2$)$_n$; and
n can be 0–10.

and then oxidizing the resulting product in contact with an active-hydrogen abstracting substance like tertiary butyl peroxypivalate.

Combinations of the peroxy and peracid compounds can also be used. The preferred compounds are the hydroperoxides. Especially preferred are cumene hydroperoxide and t.butyl hydroperoxide.

Such compounds are generally used at a concentration of about 0.5% to about 1%, by weight of the monomer charge. In some situations it may be desirable to use from 0.1% to about 0.5%, but the speed of the reaction is ordinarily reduced when this is done. Concentrations of from about 1% to 10% can also be used, but these larger amounts are usually unnecessary.

The metal salt

The metal salt used can be of a metal that can exist in more than one valence state. Illustrative of such metals are iron, tin, nickel, chromium, copper, cobalt, manganese and cerium. Iron, cerium or cobalt salts, especially in the lower valence state are preferred. Of these three, iron salts are preferred, especially ferrous octoate.

The metal salt, or mixture of metal salts, is ordinarily used at a concentration of from about 50 to about 500 parts per million of monomer charge. From about 20 to 50 parts per million can be used in certain cases, and concentrations of from 500 parts to about 10,000 parts per million can be used, but use of the lower concentration slows the rate of reaction, and use of the higher concentration appears to confer no particular advantage.

The reducing agent

The reducing agent employed in the initiator system is an organic reducing agent, or mixture of agents, soluble enough in the organic liquid so that the required amount can be dissolved. Reducing sugars, benzoin and polyamines are illustrative and satisfactory. Of these, benzoin and triethylenetetramine work best.

The reducing agent is ordinarily used at a concentration of from about 50 to about 100 times the concentration of the metal salt used. If circumstances dictate, as little as 0.2–50 times or as much as 100–250 times can be used, but this would be the exception rather than the rule.

Water

In most cases, from about 0.07% to about 5%, by weight of the total reaction mass, of water is used in the initiator system. In some polymerizations, it may be desirable to go slightly below 0.07%, and the concentration may be as high as the solubility of water in the organic liquid permits. But at concentrations below about 0.07% the rate of reaction slows undesirably and at higher concentrations the system tends to separate into two phases.

The organic liquid

The organic liquid used in the process can be any of those ordinarily used in the preparation of polymers. Aliphatic or aromatic hydrocarbons, chlorinated hydrocarbons, ethers, amides, sulfoxides, ketones, esters, alcohols, or the like are satisfactory. Mixtures of these can also be used. The choice depends on the liquids' solvency for the polymer being made.

How the initiator system is used

The system is used by placing a suitable organic liquid, the monomer charge and the initiator system in a reaction vessel under a nitrogen atmosphere. The amount of liquid and amount of monomer are chosen according to well-known principles of polymer chemistry.

The reaction mass is then allowed to stand at room temperature. After an induction period of about one-half hour, polymerization begins and continues until it is complete. The reaction itself announces its completion by no longer giving off heat.

EXAMPLES

Those skilled in the art will be able to practice the invention more easily after referring to the following examples. In these examples, all parts are by weight.

Example 1

To a reaction vessel were charged

| | Parts |
|---|---|
| Methyl methacrylate | 50 |
| Benzene | 150 |
| Tertiary butyl peroxide | 0.5 |
| Benzoin | 1.75 |
| 6% ferrous octoate solution in hydrocarbon solvent | 0.25 |
| Water | 0.25 |

This mixture was stirred at room temperature under an atmosphere of nitrogen.

After an induction period of about one-half hour, the temperature of the reaction mass began to rise. It reached a maximum of 32° C. in about 20 minutes, remained there for about 40 minutes, then began to go down gradually.

After a total reaction time of about 3 hours, 0.5 part of hydroquinone was added to the mixture to stop polymerization.

The resulting product was a viscous solution of polymethyl methacrylate containing 23.4% solids, corresponding to a conversion of about 94%. The relative viscosity of the polymer, measured as a 0.5% solution in ethylene dichloride at 25° C., was 1.41.

Example 2

The procedure of Example 1 was repeated, substituting 0.5 part of cumene hydroperoxide for the tertiary butyl hydroperoxide, and 1.75 parts of triethylenetetramine for the benzoin. The exotherm rose to about 33° C. after about one-half hour induction period.

The resulting product was a viscous solution of polymethylmethacrylate, 24.1% solids, corresponding to a 96% conversion. The relative viscosity of the polymer was 1.39.

Example 3

The procedure of Example 1 was repeated, substituting 50 parts of acrylonitrile for the methyl methacrylate and 200 parts of N-methyl pyrrolidone for the benzene.

The exotherm reached 47° C. after about 20 minutes of reaction time. The product was a viscous solution of polyacrylonitrile, 19.3% solids, corresponding to a conversion of 96.5%. The relative viscosity of the polymer was 1.78, measured as a 0.5% solution in dimethylformamide at 25° C.

Example 4

The procedure of Example 3 was repeated, substituting 0.5 part of cumene hydroperoxide for the t.butyl hydroperoxide and 1.75 parts of triethylenetetramine for the benzoin.

The reaction mixture reached a maximum exotherm of 41.5° C. after about one hour and 20 minutes.

The resulting product was a viscous solution of polyacrylonitrile, 18.7% solids, corresponding to a conversion of 93.5%. The polymer had a relative viscosity of 1.83.

What is claimed is:

1. In a low temperature process for preparing a graft or block polymer of ethylenically unsaturated monomers in a nonaqueous medium, the process comprising
   (a) bringing together a suitable monomer(s), an organic liquid and a polymerization initiator system which consists essentially of
      (1) a precursor oxidized copolymer of an ethylenically unsaturated monomer(s) and 0.1%–50% of a monomer represented by the structure

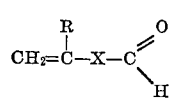

where
      R can be hydrogen, alkyl of 1–18 carbon atoms, phenyl or phenyl substituted with alkyl of 1–4 carbon atoms;
      X can be phenylene or $-(CH_2)_n-$ and
      n can be 0–10,
      (2) an organic reducing agent, and
      (3) a salt of a metal which can exist in more than one valence state, and
   (b) keeping these together until the polymerization reaction stops,
the improvement of adding from about 0.07% through about 5%, by weight of the reaction mass, of water to the reaction mass.

References Cited

UNITED STATES PATENTS

| | | | |
|---|---|---|---|
| 3,637,625 | 1/1972 | Buning et al. | 260—85.5 R |
| 2,911,398 | 11/1959 | Vandenberg | 260—89.5 A |
| 3,515,705 | 6/1970 | Balitrand | 260—85.5 F |

OTHER REFERENCES

Roberts et al., Basic Principles of Organic Chemistry, W. A. Benjamin, Inc. (1965), pp. 496–8.

Shiro et al., J. Chem. Soc., Japan 72, September 1969, pp. 2076–81.

HARRY WONG, JR., Primary Examiner

U.S. Cl. X.R.

260—73 R, 73 L, 88.7 R, 89.5 A, 91.7, 92.8 R